United States Patent
Better et al.

(10) Patent No.: US 9,161,350 B2
(45) Date of Patent: Oct. 13, 2015

(54) UPLINK TRANSMISSION TIMING

(75) Inventors: David Better, Solna (SE); Franz Heiser, Järfälla (SE); Tobias Tynderfeldt, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 109 days.

(21) Appl. No.: 13/976,125

(22) PCT Filed: Dec. 30, 2010

(86) PCT No.: PCT/SE2010/051500
§ 371 (c)(1),
(2), (4) Date: Jun. 26, 2013

(87) PCT Pub. No.: WO2012/091649
PCT Pub. Date: Jul. 5, 2012

(65) Prior Publication Data
US 2013/0336268 A1   Dec. 19, 2013

(51) Int. Cl.
H04W 72/04 (2009.01)
H04L 12/26 (2006.01)
H04W 56/00 (2009.01)

(52) U.S. Cl.
CPC ........ *H04W 72/0413* (2013.01); *H04W 56/001* (2013.01); *H04W 56/0005* (2013.01); *H04W 56/0045* (2013.01); *H04W 56/0075* (2013.01); *H04L 12/26* (2013.01)

(58) Field of Classification Search
CPC ............ H04W 72/04; H04W 72/0413; H04W 56/0005; H04W 56/0045; H04W 56/0075; H04L 12/26
USPC .......................... 370/329, 243, 280, 330, 462
See application file for complete search history.

(56) References Cited

U.S. PATENT DOCUMENTS

| | | | | |
|---|---|---|---|---|
| 8,095,161 | B2 * | 1/2012 | Sandberg | 455/502 |
| 2007/0073895 | A1 * | 3/2007 | Sebire et al. | 709/230 |
| 2009/0175292 | A1 * | 7/2009 | Noh et al. | 370/462 |
| 2009/0303896 | A1 * | 12/2009 | Che et al. | 370/252 |

FOREIGN PATENT DOCUMENTS

| | | |
|---|---|---|
| EP | 2148517 A1 | 1/2010 |
| WO | 2008104098 A1 | 9/2008 |
| WO | 2009061256 A1 | 5/2009 |

OTHER PUBLICATIONS

Alcatel-Lucent, Alcatel-Lucent Shanghai Bell, UL/DL Timing Alignment for Extended Cell Radius, 3GPP TSG-RAN WG1 #59, Jeju, Korea, Nov. 9-13, 2009, R1-094602.*
3Alcatel-Lucent, Alcatel-Lucent Shanghai Bell, Analysis of impact of cell range extension, GPP TSG-RAN WG1 #58bis, Miyazaki, Japan, Oct. 12-16, 2009, R1-093762.*
3rd Generation Partnership Project, "Analysis of Impact of Cell Range Extension." 3GPP TSG-RAN WG1 #59, R1-094601, Nov. 9-13, 2009, pp. 1-3, Jeju, Korea.
3rd Generation Partnership Project, "UL/DL Timing Alignment for Extended Cell Radius." 3GPP TSG-RAN WG1 #59, R1-094602, Nov. 9-13, 2009, pp. 1-3, Jeju, Korea.

* cited by examiner

*Primary Examiner* — Chi H Pham
*Assistant Examiner* — Shailendra Kumar
(74) *Attorney, Agent, or Firm* — Murphy, Bilak & Homiller, PLLC (57) ABSTRACT

Embodiments herein relates to a method in a radio base station (12) for handling a timing of uplink transmission from a user equipment (10) to the radio base station (12) in a radio communications network. The user equipment (10) is served in a cell (14) controlled by the radio base station (12), and which radio base station (12) and user equipment (10) are comprised in the radio communications network. The communications in the cell (14) are organized in radio frames comprising subframes. The radio base station (12) receives a first uplink transmission from the user equipment (10) in a subframe related to the radio base station (12). The radio base station then estimates a time parameter value based on a distance between the user equipment (10) and the radio base station (12) when the first uplink transmission is transmitted from the user equipment (10). The radio base station (12) then sets a time value ($N_{TA1}$) in a message, which time value ($N_{TA1}$) is to be used to set a timing of a second uplink transmission at the user equipment (10). The time value ($N_{TA1}$) is based on the estimated time parameter value and a time offset value ($\Delta T$). The radio base station (12) then transmits the message comprising the time value ($N_{TA1}$) to the user equipment.

16 Claims, 5 Drawing Sheets

UPLINK TRANSMISSION TIMING

TECHNICAL FIELD

Embodiments herein relate to a radio base station and a method therein. In particular, embodiments herein relate to handle a timing of an uplink transmission from a user equipment.

BACKGROUND

In today's radio communications networks a number of different technologies are used, such as Long Term Evolution (LTE), LTE-Advanced, 3rd Generation Partnership Project (3GPP) Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few. A radio communications network comprises radio base stations providing radio coverage over at least one respective geographical area forming a cell. User equipments are served in the cells by the respective radio base station and are communicating with the respective radio base station. The user equipments transmit data over an air interface to the radio base stations in uplink (UL) transmissions and the radio base stations transmit data to the user equipments in downlink (DL) transmissions. The user equipments and radio base stations are organized to communicate using radio frames comprising subframes.

In, for example, LTE a size of radio frames or subframes in a time domain may be expressed as a number of time units, $T_s$, where $T_s=1/(15000\times 2048)$ seconds. In the time domain, LTE DL transmissions are organized into radio frames with a time duration of $T_f$, where $T_f=307200\times T_s=10$ ms. Each radio frame comprises ten equally-sized subframes, denoted as #0-#9, of respective time length of $30720\times T_s=1$ ms.

A downlink radio frame at the user equipment is synchronised to a radio network clock broadcasted from the radio base station within the cell. Transmission of an uplink radio frame from the user equipment starts $(N_{TA}+N_{TA\,offset})\times T_s$ seconds before the start of the corresponding downlink radio frame at the user equipment. $N_{TA}$ is defined as a timing advance value, defining a timing for the transmission of uplink radio frame before the time of the corresponding downlink radio frame at the user equipment. $N_{TA}$ is expressed in units of $T_s$ and $0\leq N_{TA}\leq 20512$, and transmitted from the radio base station to the user equipment in a Timing Advance Command. $N_{TA\,offset}$ is defined as fixed timing advanced offset expressed in units of $T_s$. $N_{TA\,offset}=0$ for a radio frame structure according to Frequency Division Duplex (FDD) operation and is a fixed value set at the user equipment. Thus, a user equipment operating in FDD mode, where $N_{TA\,offset}=0$, is able to start a transmission of an uplink radio frame up to $20512T_s$, or ~668 µs, before the reception of the corresponding downlink radio frame.

The purpose of the above function is to enable the signals, that is, uplink transmissions in radio frames, from user equipments at varying distances from the radio base station to have their uplink transmission in radio frames aligned in time at the radio base station receiver. User equipments at a long distance from the radio base station will have to advance their uplink transmissions with the amount corresponding to two times the propagation delay from the user equipment transmitter to the user equipment receiver. 668 µs would thus correspond to a radio base station to user equipment distance of about 100 km. Each active user equipment has its timing monitored and tracked by the radio base station. When needed, the radio base station sends Timing Alignment Commands (TAC) to the user equipment, to order the user equipment to change its uplink timing of the uplink transmission. Typically this is needed when the user equipment is moving towards or away from the radio base station.

Due to the requirements on the radio base station to provide fast feedback on user equipment transmissions, so called Hybrid Automatic Repeat Request (HARQ) feedback, a time budget for processing in the radio base station is restricted. A requirement of HARQ in the uplink is that a retransmission needs to be performed within 8 ms from the original uplink transmission. Within this retransmission time the user equipment should perform the original uplink transmission and the radio base station should receive and handle the data. Furthermore, the radio base station should transmit ACK/NAK and the user equipment should receive and handle the data before performing retransmission. This leads to that the radio base station has typically about 3 ms as the time budget for processing the data. This time budget should be enough to cover reception, scheduling and transmission.

On the user equipment side, a time budget for processing is in the range 2,332 ms to 3 ms, depending on the distance from the radio base station.

The time budget for processing in the radio base station of 3 ms is enough when all the Layer 1 and Layer 2 algorithms during communication are executed. Layer 1 is the physical layer and layer 2 is the data link layer. The time budget for processing is today fixed, which leads to a limited performance of the radio base station.

Time alignment is disclosed in document "UL/DL Timing Alignment for Extended Cell Radius" Alcatel-Lucent Alcatel-Lucent Shanghai Bell Publication data: 3GPP Draft; R1-094602, 20091109 3rd Generation Partnership Project (3GPP), Mobile Competence Centre; 650, route des Lucioles; F-06921 Sophia-Antipolis Cedex; France; Nr: Jeju; 20091109 XP 050389013. Processing time is mentioned in "Analysis of impact of cell range extension," Alcatel-Lucent Alcatel-Lucent Shanghai Bell Publication data: 3GPP Draft; R1-094601, 20091109 3rd Generation Partnership Project (3GPP), Mobile Competence Centre; 650, route des Lucioles; F-06921 Sophia-Antipolis Cedex; France; Nr: Jeju; 20091109; XP 050389012.

SUMMARY

An object of embodiments herein is to improve the performance of a radio base station in a radio communications network.

This object is achieved by embodiments according to the claims presented herein.

According to an aspect of embodiments herein the object is achieved by a method in a radio base station for handling a timing of an uplink transmission from a user equipment to the radio base station in a radio communications network. The user equipment is served in a cell controlled by the radio base station. The radio base station and the user equipment are comprised in the radio communications network. Communications, in the cell, are organized in radio frames comprising subframes. The radio base station receives a first uplink transmission from the user equipment in a subframe related to the radio base station. The radio base station estimates a time parameter value based on a distance between the user equipment and the radio base station when the first uplink transmission is transmitted from the user equipment.

The radio base station then sets a time value in a message, which time value is to be used to set a timing of a second uplink transmission at the user equipment. Further, the time value is based on the estimated time parameter value and a time offset value. The radio base station transmits the message comprising the time value to the user equipment.

According to another aspect of embodiments herein the object is achieved by a radio base station for handling a timing of an uplink transmission from a user equipment to the radio base station in a radio communications network. The user equipment is served in a cell controlled by the radio base station in which cell communications are organized in radio frames comprising subframes.

The radio base station comprises a receiver configured to receive a first uplink transmission from the user equipment in a subframe related to the radio base station. Furthermore, the radio base station comprises an estimating circuit configured to estimate a time parameter value based on a distance between the user equipment and the radio base station when the first uplink transmission is transmitted from the user equipment.

The radio base station furthermore comprises a setting circuit configured to set a time value in a message. The time value is to be used to set a timing of a second uplink transmission at the user equipment and the time value is based on the estimated time parameter value and a time offset value. The radio base station also comprises a transmitter configured to transmit the message comprising the time value to the user equipment.

Embodiments herein transfer some of the user equipment's time budget for processing to the radio base station's time budget for processing by ordering the user equipment to advance its uplink timing more than needed with the time offset value and thereby reducing the effective cell range. Thus, the time budget for processing at the radio base station is in embodiments herein made larger, and e.g. baseband processing units arranged to handle data within the radio base station may be able to utilize more advanced algorithms or process more data using the same algorithms.

BRIEF DESCRIPTION OF THE DRAWINGS

Embodiments will now be described in more detail in relation to the enclosed drawings, in which.

DETAILED DESCRIPTION

Figure 1:
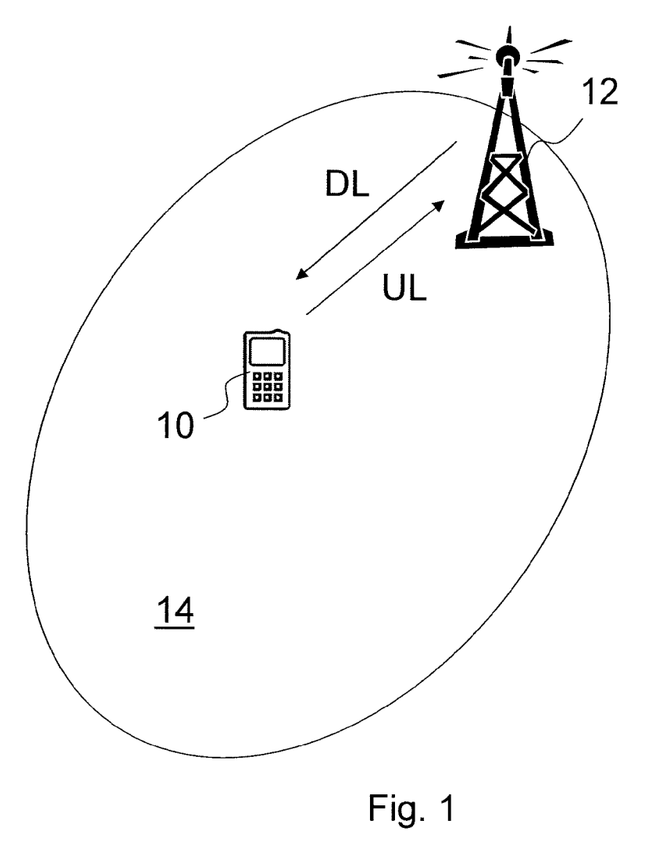
FIG. 1 is a block diagram depicting a radio communications network.

FIG. 1 is a block diagram of a radio communications network, such as a Long Term Evolution (LTE), LTE-Advanced, 3rd Generation Partnership Project (3GPP) Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), or similar network. The radio communications network comprises a radio base station 12 that provides radio coverage over a geographical area forming a cell 14. A user equipment 10 is served in the cell 14 by the radio base station 12 and is communicating with the radio base station 12. The user equipment 10 transmits data over an air interface to the radio base station 12 in an uplink (UL) transmission and the radio base station 12 transmits data to the user equipment 10 in a downlink (DL) transmission.

The radio base station 12 may also be referred to as e.g. a NodeB, an evolved Node B (eNB, eNode B), a base transceiver station, Access Point Base Station, base station router, or any other network unit capable to communicate with a user equipment 10 within the cell 14 served by the radio base station 12, depending e.g. of the radio access technology and terminology used.

The user equipment 10 may e.g. be represented by a wireless communication terminal, a mobile cellular phone, a Personal Digital Assistant (PDA), a legacy user equipment, a wireless platform, a laptop, a computer or any other kind of device capable to communicate wirelessly with the radio base station 12.

As stated above the downlink and uplink transmissions are organized into radio frames with a time duration of $T_f$, where $T_f = 307200 \times T_s = 10$ ms and Frequency Division Duplexing (FDD) operation is supported.

Embodiments herein are applicable to both full duplex FDD and half duplex FDD. Full duplex FDD means that communication is enabled in both directions simultaneously and half duplex FDD means that communication is enabled in both directions, one at a time.

Each radio frame is $T_f = 307200 \cdot T_s = 10$ ms long and comprises twenty slots of time length $T_{slot} = 15360 \cdot T_s = 0.5$ ms, numbered from 0 to 19. A subframe is defined as two consecutive slots. For FDD, ten subframes are available for downlink transmission and ten subframes are available for uplink transmissions in each 10 ms interval. Uplink and downlink transmissions are separated in the frequency domain. In uplink transmissions for transmitting data from the user equipment 10 to the radio base station 12, there may be a Random Access Channel (RACH) used for transmitting an initial control message, and a Shared Channel (SCH) used for transmitting user traffic or control messages.

A procedure according to embodiments herein is triggered when a user equipment 10 tries to access the network by means of a first uplink transmission, such as during a random access procedure. The random access procedure comprises to transmit a random access preamble over a Random Access Channel (RACH) to the radio base station 12. The random access preamble may comprise a Cyclic Prefix (CP) of a time length $T_{CP}$ and a sequence part, e.g. representing a long Zadoff Chu sequence, of a time length $T_{SEQ}$. The cyclic prefix is repeated at the end of the symbol. The CP acts as a guard interval eliminating the intersymbol interference from the previous symbol. Also, as repetition of the end of the symbol, it allows the linear convolution of a frequency-selective multipath channel to be modelled as circular convolution. This approach allows for simple frequency-domain processing, such as channel estimation and equalization.

According to embodiments herein, the radio base station 12 may receive the random access preamble and estimates a time parameter value, corresponding to the time advance value $N_{TA}$ above, based on e.g. a correlation peak of the received random access preamble in a time domain compared to a start time of a reference subframe of reception at the radio base station 12. The start time of the reference subframe is synchronized to an internal clock of the radio base station 12. The difference between the position of correlation peak in the time domain and the start time indicates a distance between the user equipment 10 and the radio base station 12 when the random access preamble was transmitted. Actually the difference indicates two times the distance and the reason for that is that the delay is two times the propagation delay, since the user equipments internal subframe timing is synchronized to a timing in the cell 14, but the internal subframe timing is delayed with respect to the cell 14 by a DL propagation delay. The UL transmissions is also delayed while reaching the radio base station 12 which make the total delay of UL transmissions equal a round trip time, i.e. two times the one way propagation delay.

Hence, the estimated time parameter value is based on the distance between the user equipment 10 and the radio base station 12 when the first uplink transmission is transmitted from the user equipment, where the estimated time parameter may be based on twice the distance, indicated by a round-trip time of a transmission between the user equipment 10 and the radio base station 12.

The radio base station 12 sets a time value $N_{TA1}$ to be used to set timing of a following uplink transmission, e.g. second uplink transmission, at the user equipment 10. The time value $N_{TA1}$ is based on the estimated time parameter value plus a time offset value $\Delta T$ for increasing the time budget for processing in the radio base station 12. The time offset $\Delta T$ thus increases the distance virtually between the user equipment 10 and the radio base station 12.

The time value $N_{TA1}$ may then be transmitted in a Time Alignment Command (TAC) of a random access response or another message to the user equipment 10 to be used when timing the second uplink transmission of the user equipment 10 or more uplink transmissions. The user equipment 10 may use the time value for the following uplink transmissions during an interval indicated by a timer such as a Time Alignment Timer (TAT) or until receiving a new time value. The timer may start upon receiving the message comprising the time value.

By using the same time offset value $\Delta T$ for all user equipments within the cell 14 the uplink transmissions in corresponding subframes of all user equipments may be time aligned with one another at the radio base station 12. The time budget for processing in the radio base station 12 will increase and thus enabling a higher capacity system for the radio base station 12 to perform complicated decoding procedures and similar.

The increased time budget for processing may also be used for a time lost in a transmission between radio units and a baseband processing unit in the radio base station 12. For example, in some radio base stations radio units, such as antennas, may be arranged remotely, up to a couple of kilometers, from the baseband processing unit also referred to as a digital unit. By increasing the time budget the baseband processing unit is given more time for processing received transmissions easing the pressure on the implementation.

Figure 2:
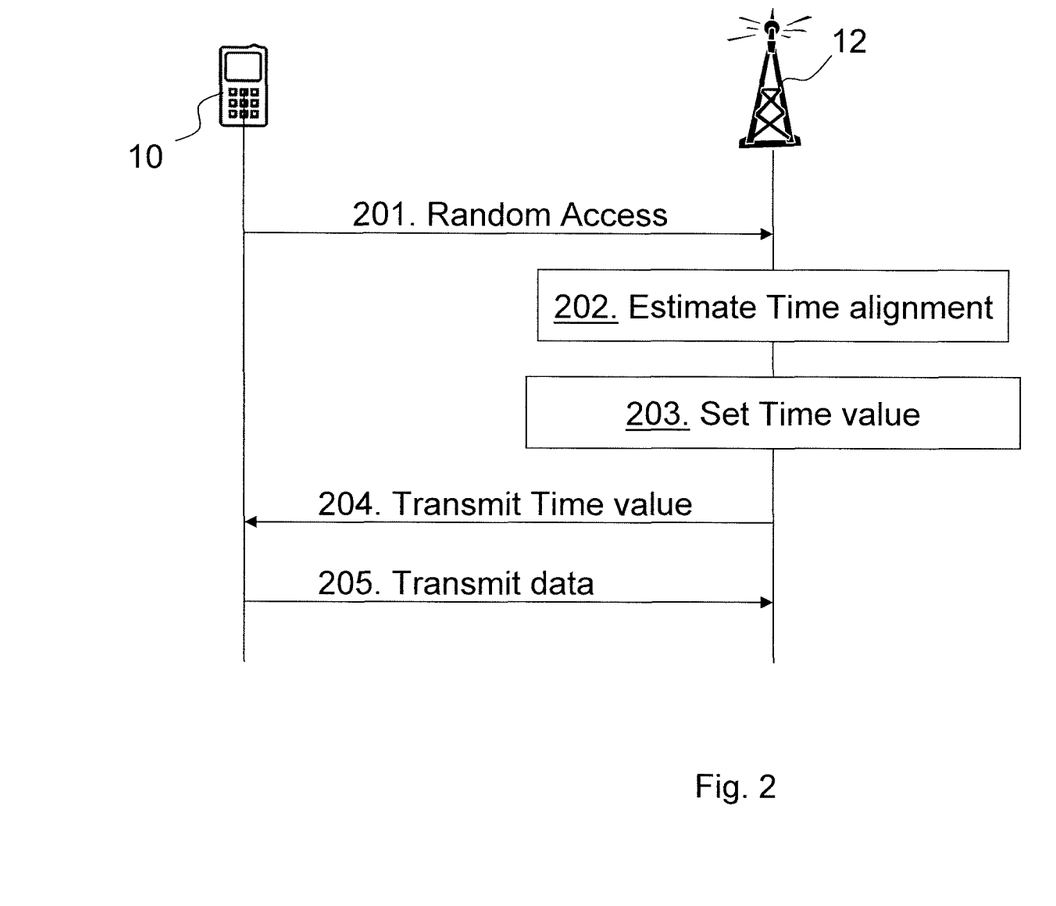
FIG. 2 is a schematic combined flowchart and signaling scheme in a radio communications network.

FIG. 2 is a schematic flowchart and signalling scheme in the radio communications network.

Step 201.

The user equipment 10 performs a first uplink transmission to the radio base station 12. In the illustrated example, the user equipment 10 performs a random access procedure when accessing the cell 14. Thus, the user equipment 10 transmits a random access preamble at an initial time, which transmission of the random access preamble is time aligned with a subframe of an internal uplink radio frame of the user equipment 10. The internal uplink radio frame is synchronised to a clock broadcasted in the cell 14 by the radio base station 12.

Step 202.

The radio base station 12 estimates a time parameter value based on the received random access preamble. For example, the radio base station 12 may determine a correlation peak of the received uplink transmission and set this as the time of reception of the random access preamble. The radio base station 12 may then compare the time of reception to a reference start time of a reference subframe of a reference radio frame at the radio base station 12, resulting in a time difference. This time difference is indicating the distance between the radio base station 12 and the user equipment 10.

In other words, the estimated time parameter value is based on a distance between the user equipment 10 and the radio base station 12 when the first uplink transmission is transmitted from the user equipment 10. The distance may be based on a position of the received uplink transmission in a time domain in the subframe of the radio base station 12. The estimated time parameter value may be based on a round-trip time taken for a transmission from the user equipment 10 to the radio base station 12 to take both delay in UL and in DL into account.

Step 203.

The radio base station 12 then sets a time value $N_{TA1}$ to be sent to the user equipment 10. The time value $N_{TA1}$ may comprise the time parameter value plus the time offset value $\Delta T$. The time value $N_{TA1}$ is to be used to set a timing of a second uplink transmission at the user equipment 10.

The time offset value $\Delta T$ may initially be set as a pre-set time value. However, the time offset value $\Delta T$ may be adjustable. For example, the time offset value $\Delta T$ may be adjusted based on measurements of currently active user equipments. A user equipment that is furthest from the radio base station 12 sets the time offset value $\Delta T$, wherein time offset value $\Delta T$ is set as a value to maximize a throughput for a user equipment that is furthest from the radio base station 12. The time offset value $\Delta T$ may be set based on the user equipment distribution within the cell 14. The time offset value $\Delta T$ may be set to a difference between a configurable value C and a fixed value. The configurable value, C, may correspond to an adjustment of the cell-edge and the fixed value may be the distance at which all user equipments can achieve peak-rate. By letting the time offset value $\Delta T$ be:

If C>$\Delta T$
$\Delta T$=C−$\Delta T$
else
$\Delta T$=0

All user equipments will be able to achieve peak-rate while the maximum amount of processing time has been transferred from the user equipment 10 to the radio base station 12.

If peak-rate for all user equipments within the cell 14 is not of importance, the fixed value may be increased, thus increasing latency in the radio base station 12 at the cost of reduced peak-rate performance for some user equipments in the cell 14.

Step 204.

The radio base station 12 transmits the time value $N_{TA1}$ to the user equipment 10 in the message. For example, the radio base station 12 may transmit a random access response, such as a random access message 2, which random access response comprises a timing alignment command. The timing alignment command (TAC) may comprise the time value $N_{TA1}$. Thus, the time offset value $\Delta T$ is added to the time parameter value in the TAC keeping the uplink transmissions of user equipments aligned to a point of reference such as a reference subframe related to the radio base station 12, during the time of the connection.

Step 205.

The user equipment 10 then uses the time value $N_{TA1}$ in the received message to transmit another uplink transmission such as an Acknowledgement (ACK), Non-Acknowledgement (NACK), or other uplink data. That is, a transmission time for a following uplink transmission is based on the time value $N_{TA1}$ or brought forward the time value $N_{TA1}$ relative a DL subframe start time.

By using the same time offset value ΔT for all active user equipments within the cell 14 the inter symbol interference is unaffected as the uplink transmissions between the user equipments are still time aligned with each other at the radio base station 12.

In some embodiments the time offset value ΔT may be fine-tuned by measuring on other uplink transmissions. Thereby, the radio base station 12 is enabled to increase/reduce the time budget for processing dynamically based on load, user equipment distance distribution or other user equipment statistics in the cell 14 or similar.

There is a possibility that the user equipment 10 from which the radio base station 12 has 'stolen' processing time will not be able to transmit data at the specified peak rate due to lack of processing time. If the radio base station 12 detects that the user equipment 10 is performing under a set threshold the radio base station 12 may reduce the maximum transport block size for UL transmissions of the user equipment 10 and other user equipments that are far from the radio base station 12 or reduce a transmission rate based on increased Non-Acknowledgements (NACK) by adjusting the transport block size for UL transmissions to meet a predefined NACK ratio. The set threshold may then be set as a maximum distance or a maximum number of received NACKs.

This approach may reduce the throughput for the user equipment 10 when being at a long distance from the radio base station 12, but the overall capacity of the cell 14 will most likely increase due to the increased time budget, also referred to as processing headroom, in the radio base station 12.

Figure 3A:
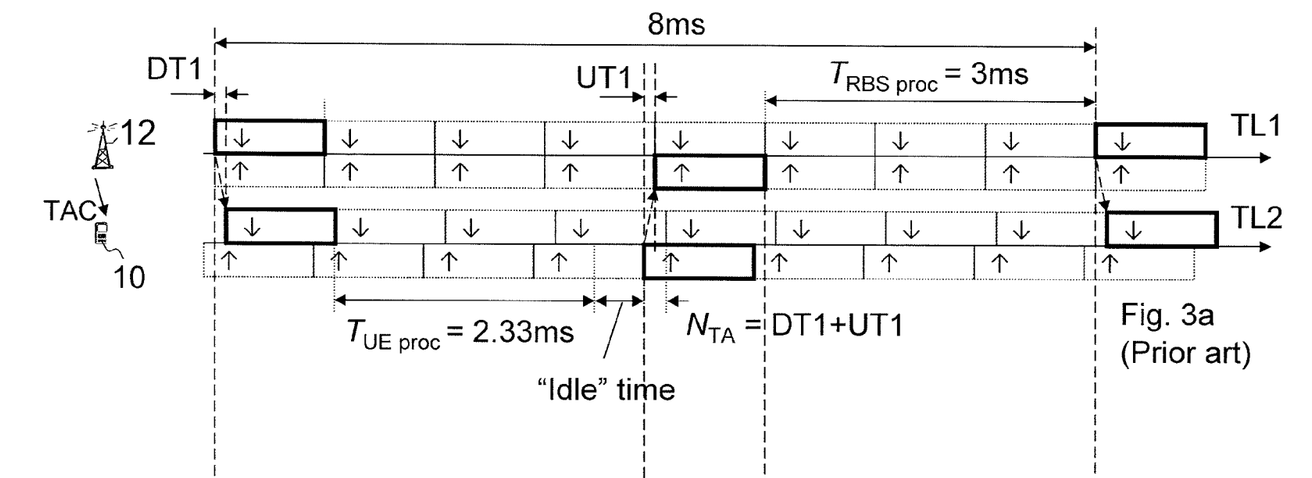
FIG. 3 is a block diagram depicting time alignment according to some embodiments.
Figure 3B:
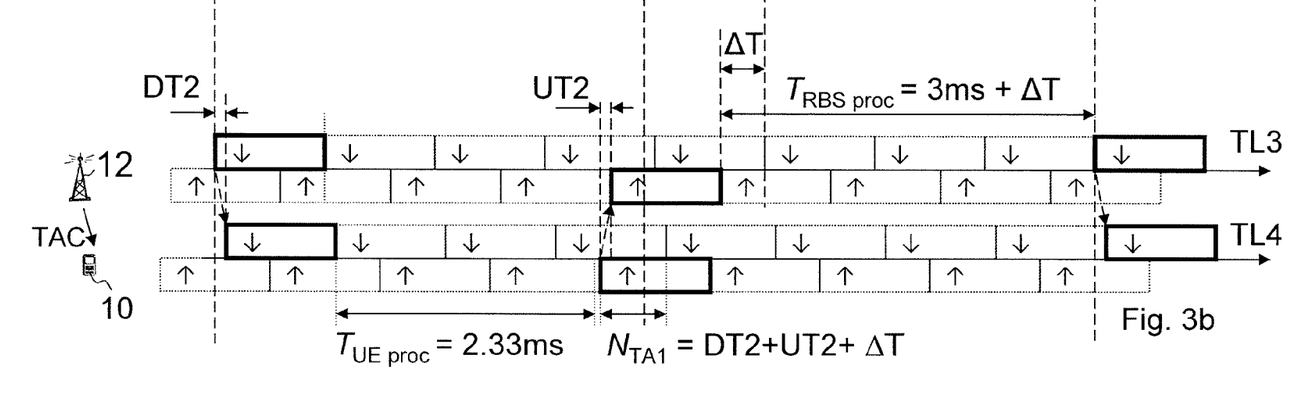

FIGS. 3a-3b is a schematic overview of comparing a time alignment of some embodiments with a time alignment of prior art. Subframes comprising data are weighted with a thinker line.

In FIG. 3a a time alignment of subframes according to prior art is shown. Along a first time reference line TL1, DL subframes of radio base station 12 are shown on the upper side of the first time reference line TL1. UL subframes of the radio base station 12 are shown below the first time reference line TL1.

Along a second time line TL2, DL subframes of the user equipment 10 are shown on the upper side of the second time reference line TL2. UL subframes of the user equipment 10 are shown below the second time line TL2.

As seen a DL subframe at the user equipment is displaced a first DL time DT1 compared to a corresponding reference DL subframe in the radio base station 12. The subframes in the radio base station 12 follow an internal clock that has been synchronized within the cell 14. This first DL time DT1 displacement is based on a delay in the DL transmission to the user equipment 10, which delay is indicating a distance between the radio base station 12 and the user equipment 10.

The radio base station 12 has transmitted to the user equipment 10 a TAC indicating how much the UL transmission in an UL subframe should be pre transmitted. The time alignment command is indicating a time advance value $N_{TA}$ related to the DL subframe of the user equipment 10. This means that the time alignment command comprises the time advance value $N_{TA}$ that is based on a received delay time indication of an UL transmission compared to a UL subframe related to the radio base station 12. The time advance value $N_{TA}$ is actually indicating round-trip time to the user equipment 10, i.e. $N_{TA}$=DT1+UT1.

Following the transmission process, the user equipment 10 receives a DL transmission in a first subframe from the radio base station 12 and processes the DL transmission after receiving the first subframe. The user equipment 10 needs at maximum a user equipment process time $T_{UE\ Proc}$ of e.g. 2.33 ms. The user equipment 10 then enters an Idle mode for an Idle time before transmitting an UL transmission e.g. a non-Acknowledgement (NACK) message to the radio base station 12. Idle means here that the user equipment 10 does not perform any data processing in the communication procedure. The idle time is based on the transmitted time advance value $N_{TA}$; the larger the time advance value $N_{TA}$ is, the smaller is the idle time.

The UL transmission is sent in an UL subframe to the radio base station 12 displaced in time related to the DL subframe timing using the time advance value $N_{TA}$ in the TAC. The UL subframe is also delayed in the air during transmission due to the distance between the user equipment 10 and the radio base station 12. The radio base station 12 receives the UL transmission delayed a first UL time UT1 in a corresponding UL subframe of the radio base station 12. After receiving the UL transmission in the UL subframe of the radio base station 12, the radio base station 12 processes the UL transmission. As may be seen from the FIG. 3a, the radio base station 12 comprises a time budget $T_{RBS\ pros}$ of 3 ms for processing before possible retransmission at 8 ms.

In FIG. 3b a transmission according to an embodiment disclosed herein is shown. Along a third time reference line TL3, DL subframes of the radio base station 12 are shown on the upper side of the third time reference line TL3. UL subframes of the radio base station 12 are shown below the third time reference line TL3.

Along a fourth time line TL4, DL subframes of the user equipment 10 are shown on the upper side of the fourth time reference line TL4. UL subframes of the user equipment 10 are shown below the fourth time line TL4.

As seen a DL subframe at the user equipment 10 is displaced a second DL time DT2 compared to a corresponding reference DL subframe in the radio base station 12. The second DL time DT2 corresponds to the first DL time DT1 in FIG. 3a. The subframes in the radio base station 12 follow an internal clock that has been synchronized within the cell 14. This displacement DT2 is based on a delay in the DL transmission to the user equipment 10, which delay is indicating a distance between the radio base station 12 and the user equipment 10.

The user equipment 10 has received a TAC from the radio base station 12 indicating a time value $N_{TA1}$ to advance the timing of an uplink transmission, i.e. indicating how much the UL transmission in an UL subframe should be pre-transmitted. As the user equipment 10 transmits according to a time structure that corresponds to a time structure of the DL following a clock of the cell 14, the TAC is indicating the time value $N_{TA1}$ related to the DL subframe of the user equipment 10. Thus, the TAC according to embodiments herein comprises the time value $N_{TA1}$, which is indicating round-trip time to the user equipment 10 plus the time offset value, $N_{TA1}$=DT2+UT2+ΔT=DT1+UT1+ΔT=$N_{TA}$+ΔT.

Following the transmission process, the radio base station 12 transmits DL data to the user equipment 10. The data is delayed DT2 before received over the duration of a first subframe at the user equipment 10. The user equipment 10 then processes the received data for a maximum user equipment process time $T_{UE\ Proc}$ of e.g. 2.33 ms. According to embodiments herein an UL transmission in an UL subframe is then sent to the radio base station 12 at a time instance set the time value $N_{TA1}$ before the DL subframe in the user equipment 10. The UL transmission is delayed a second uplink time UT2 in the air during transmission due to the distance between the user equipment 10 and the radio base station 12. The radio base station 12 receives the UL transmission at a corresponding UL subframe of the radio base station 12. UT2 corresponds to the UT1 in FIG. 3a. The radio base station 12 then handles and processes the received uplink data over a time period denoted as $T_{RBS\,pros}$ before possible retransmission at 8 ms. The time offset value $\Delta T$ in the $N_{TA1}$ increases the time budget for processing in the radio base station 12 as disclosed in FIG. 3b, i.e. 3 ms+$\Delta T$.

It should be noted that the UL subframes are thus not time aligned with the DL subframes at the radio base station 12.

In embodiments herein the radio base station 12 increases the distance to the radio base station 12 virtually by adding the time offset value $\Delta T$. A cell range may limit the time offset value $\Delta T$.

Figure 4:
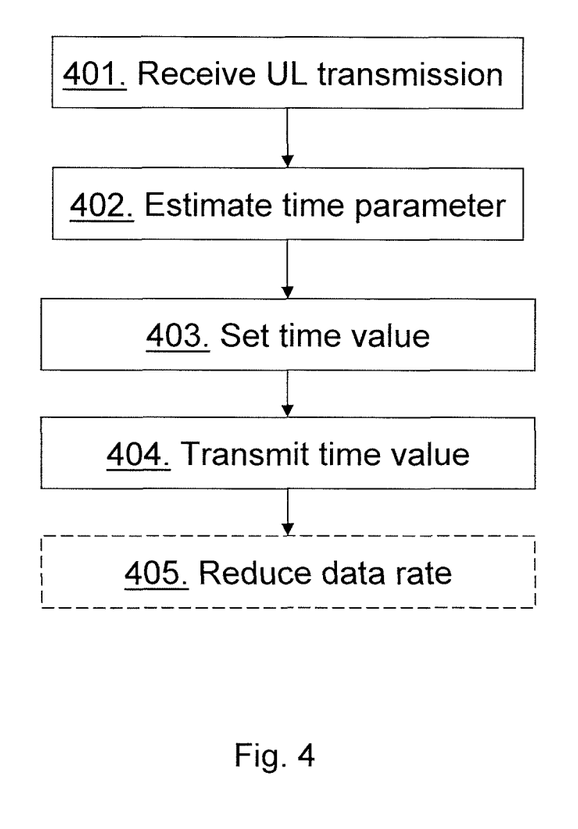
FIG. 4 is a schematic flowchart in a radio base station.

The method steps in the radio base station 12 for handling a timing of an uplink transmission from the user equipment 10 to the radio base station 12 in the radio communications network according to some general embodiments will now be described with reference to a flowchart depicted in FIG. 4. The steps do not have to be taken in the order stated below, but may be taken in any suitable order. The user equipment 10 is served in a cell 14 controlled by the radio base station 12. The radio base station 12 and user equipment 10 are comprised in the radio communications network, and in the cell 14 communications are organized in radio frames comprising subframes.

Step 401.

The radio base station 12 receives a first uplink transmission from the user equipment 10 in a subframe related to the radio base station 12. Uplink transmission may comprise any transmission such as transmitting UL data, random access transmission, or similar. The first uplink transmission may in some embodiments comprise a random access preamble in a random access request from the user equipment 10.

Step 402.

The radio base station 12 estimates a time parameter value based on a distance between the user equipment 10 and the radio base station 12 when the first uplink transmission is transmitted from the user equipment 10.

In some embodiments, the distance between the user equipment 10 and the radio base station 12 is based on a position of the received first uplink transmission in a time domain of the subframe related to the radio base station 12.

For example, the radio base station 12 may estimate the distance between the radio base station 12 and the user equipment 10 by measuring a time domain position of the received first uplink transmission in reference to a subframe timing of the radio base station 12. The time domain position may indicate the round-trip time for a transmission between the user equipment 10 and the radio base station 12.

Step 403.

The radio base station 12 sets a time value $N_{TA1}$ in a message. The time value $N_{TA1}$ is to be used to set a timing of a second uplink transmission at the user equipment 10. For example, the radio base station 12 sets the timing for transmitting data, an Acknowledgement (ACK) or Non-Acknowledgement (NACK) transmission. The time value $N_{TA1}$ is based on the estimated time parameter value and a time offset value $\Delta T$.

The time offset value $\Delta T$ may be pre-set or based on statistics measured in the cell 14. In some embodiments, the time offset value $\Delta T$ may be continuously updated based on measurements within the cell 14. For example, a first pre-set time offset value $\Delta T$ may be used initially and then another time offset value $\Delta T$ may be used based on e.g. user equipment distribution within the cell 14.

Step 404.

The radio base station 12 transmits the message comprising the time value $N_{TA1}$ to the user equipment. The time value may in some embodiments be comprised in a time alignment command of the message.

In some embodiments the time value is comprised in a random access response.

Step 405.

The radio base station 12 may in some embodiments as indicated by the dashed line reduce a data rate of the user equipment 10 when the distance between the user equipment 10 and the radio base station 12 exceeds a threshold value. In some embodiments the radio base station 12 may reduce the data rate by reducing transport block size for uplink transmission for the user equipment 10.

The time budget for processing in the radio base station 12 may increase and thus enabling a higher capacity system for the radio base station 12 to perform complicated decoding procedures and similar.

Figure 5:
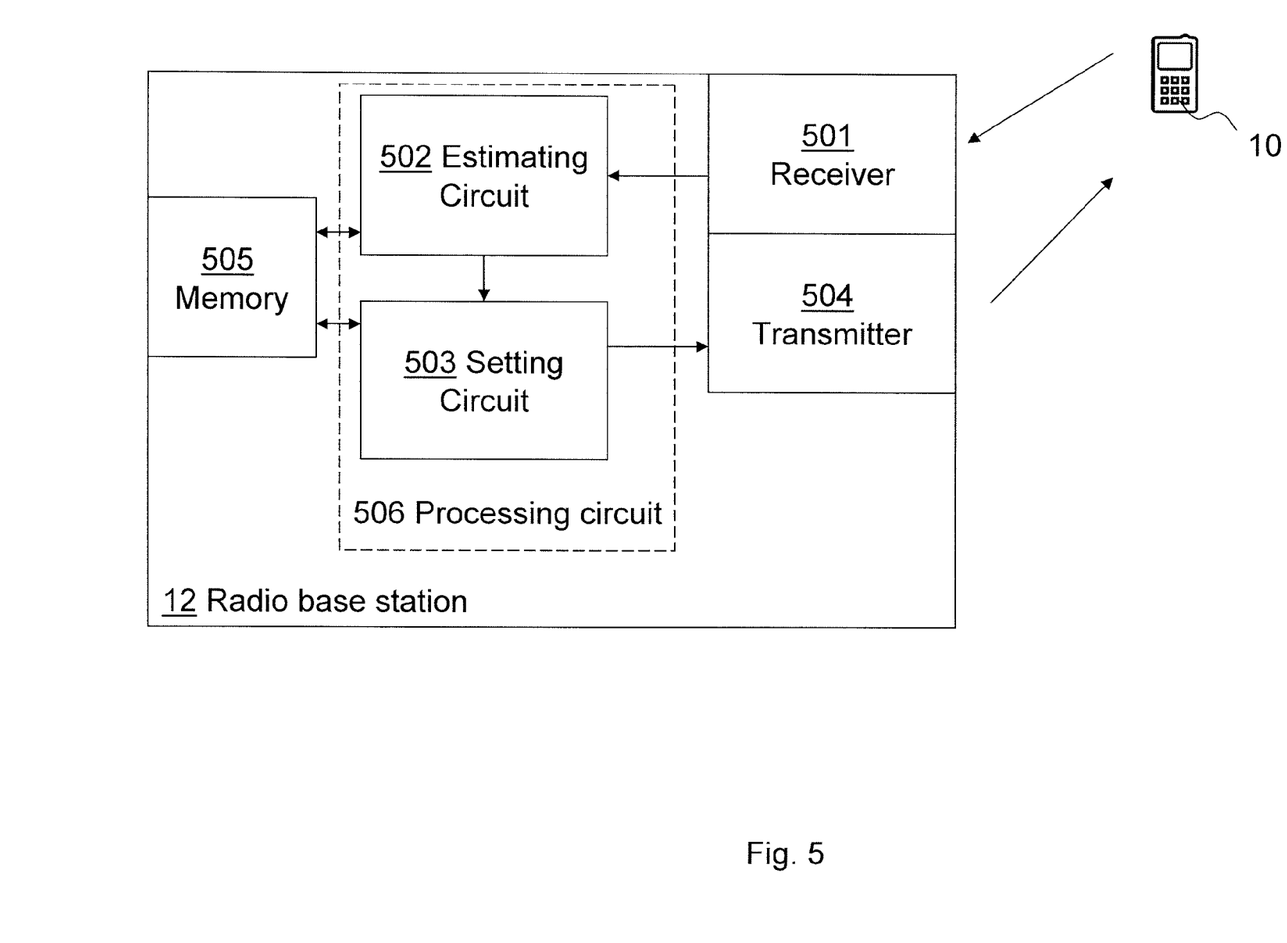
FIG. 5 is a block diagram depicting a radio base station.

In order to perform the method a radio base station 12 is provided. FIG. 5 is a block diagram depicting the radio base station 12 for handling a timing of an uplink transmission from the user equipment 10 to the radio base station 12 in the radio communications network. The user equipment 10 is served in a cell 14 controlled by the radio base station 12 and in which cell 14 communications are organized in radio frames comprising subframes.

The radio base station 12 comprises a receiver 501 configured to receive a first uplink transmission from the user equipment 10 in a subframe related to the radio base station 12. The first uplink transmission may in some embodiments comprise a random access preamble in a random access request from the user equipment 10.

The radio base station 12 further comprises an estimating circuit 502 configured to estimate a time parameter value. The time parameter value is based on a distance between the user equipment 10 and the radio base station 12 when the first uplink transmission is transmitted from the user equipment 10. The distance between the user equipment 10 and the radio base station 12 may be determined based on a position of the received first uplink transmission in a time domain of the subframe related to the radio base station 12. The position may indicate round-trip time between the user equipment 10 and the radio base station 12.

The radio base station additionally comprises a setting circuit 503 configured to set a time value in a message. The time value is to be used to set a timing of a second uplink transmission at the user equipment 10. The time value is based on the estimated time parameter value and a time offset value. The time value may in some embodiments be comprised in a random access response. The time value may be comprised in a time alignment command of the message.

The time offset value may be pre-set or based on statistics measured in the cell 14. Additionally, the time offset value may continuously be updated based on measurements within the cell 14.

Furthermore, the radio base station 12 comprises a transmitter 504 configured to transmit the message comprising the time value to the user equipment 10.'

The user equipment 10 will use the time value to transmit the following uplink transmissions and thereby transfer some time budget for processing to the radio base station 12. The time budget for processing in the radio base station 12 may thus increase and consequently enables a higher capacity system for the radio base station 12 to perform complicated decoding procedures and similar.

The radio base station 12 may further comprise a reduction circuit 505 configured to reduce a data rate of the user equipment 10 when the distance between the user equipment 10 and the radio base station 12 exceeds a threshold value.

The reducing circuit 505 may further be is configured to reduce transport block size for uplink transmission for the user equipments.

The radio base station 12 may also comprise a memory 506, which may comprise one or more memory units and may be used to store for example data such as threshold values, quality values, time values, time parameter value, clock values, reference points, timers, application to perform the methods herein when being executed on the radio base station 12 or similar.

The embodiments herein for handling a timing of an uplink transmission from the user equipment 10 may be implemented through one or more processors, such as a processing circuit 507 in the base station 12 depicted in FIG. 5, together with computer program code for performing the functions and/or method steps of the embodiments herein. The program code mentioned above may also be provided as a computer program product, for instance in the form of a data carrier carrying computer program code for performing the present solution when being loaded into the radio base station 12. One such carrier may be in the form of a CD ROM disc. It is however feasible with other data carriers such as a memory stick. The computer program code may furthermore be provided as pure program code on a server and downloaded to the radio base station 12.

In the drawings and specification, there have been disclosed exemplary embodiments herein. However, many variations and modifications can be made to these embodiments without substantially departing from the principles of the embodiments. Accordingly, although specific terms are employed, they are used in a generic and descriptive sense only and not for purposes of limitation, the scope of the invention being defined by the following claims.

The invention claimed is:

1. A method in a radio base station for handling a timing of uplink transmissions from a user equipment to the radio base station in a radio communications network, in which the user equipment is served in a cell controlled by the radio base station, and in which cell communications are organized in radio frames comprising subframes, the method comprising:
    receiving a first uplink transmission from the user equipment in a subframe related to the radio base station;
    estimating a time parameter value based on a distance between the user equipment and the radio base station when the first uplink transmission is transmitted from the user equipment;
    setting a time value in a message, which time value is to be used to set a timing of a second uplink transmission at the user equipment, and which time value is based on the estimated time parameter value and a time offset value for increasing a time budget for processing in the radio base station; and
    transmitting the message comprising the time value to the user equipment.

2. The method according to claim 1, wherein the first uplink transmission comprises a random access preamble in a random access request from the user equipment and the time value is comprised in a random access response.

3. The method according to claim 1, wherein the distance between the user equipment and the radio base station is based on a position of the received first uplink transmission in a time domain of the subframe related to the radio base station.

4. The method according to claim 1, wherein the time value is comprised in a time alignment command of the message.

5. The method according to claim 1, wherein the time offset value is pre-set or based on statistics measured in the cell.

6. The method according to claim 1, wherein the time offset value is continuously updated based on measurements within the cell.

7. The method according to claim 1, further comprising reducing a data rate of the user equipment when the distance between the user equipment and the radio base station exceeds a threshold value.

8. The method according to claim 7, wherein the reducing comprises reducing a transport block size for uplink transmission for the user equipment.

9. A radio base station for handling a timing of uplink transmission from a user equipment to the radio base station in a radio communications network, in which the user equipment is served in a cell controlled by the radio base station, and in which cell communications are organized in radio frames comprising subframes, and wherein the radio base station comprises;
    a receiver configured to receive a first uplink transmission from the user equipment in a subframe related to the radio base station;
    an estimating circuit configured to estimate a time parameter value based on a distance between the user equipment and the radio base station when the first uplink transmission is transmitted from the user equipment;
    a setting circuit configured to set a time value in a message, which time value is to be used to set a timing of a second uplink transmission at the user equipment, and which time value is based on the estimated time parameter value and a time offset value for increasing a time budget for processing in the radio base station; and
    a transmitter configured to transmit the message comprising the time value to the user equipment.

10. The radio base station according to claim 9, wherein the first uplink transmission comprises a random access preamble in a random access request from the user equipment and wherein the time value is comprised in a random access response.

11. The radio base station according to claim 9, wherein the distance between the user equipment and the radio base station is based on a position of the received first uplink transmission in a time domain of the subframe related to the radio base station.

12. The radio base station according to claim 9, wherein the time value is comprised in a time alignment command of the message.

13. The radio base station according to claim 9, wherein the time offset value is pre-set or based on statistics measured in the cell.

14. The radio base station according to claim 9, wherein the time offset value is continuously updated based on measurements within the cell.

15. The radio base station according to claim 9, further comprising a reduction circuit configured to reduce a data rate of the user equipment when the distance between the user equipment and the radio base station exceeds a threshold value.

16. The radio base station according to claim 9, wherein the reducing circuit is configured to reduce a transport block size for uplink transmission for the user equipments.

* * * * *